United States Patent
Rieger et al.

[11] Patent Number: 6,039,364
[45] Date of Patent: Mar. 21, 2000

[54] SWITCH CABINET FOR ELECTRONICS AND ELECTRICAL ENGINEERING

[75] Inventors: Uwe Rieger, Karlsbad; Klaus Kern, Straubenhardt, both of France; Daniel Thomas, Seebach, Germany

[73] Assignee: Schroff GmbH, Straubenhardt, Germany

[21] Appl. No.: 09/111,807

[22] Filed: Jul. 8, 1998

[30] Foreign Application Priority Data

Jul. 9, 1997 [DE] Germany ............................ 197 29 200

[51] Int. Cl.[7] ................................................. E05C 19/00
[52] U.S. Cl. .................. 292/300; 292/342; 292/DIG. 46
[58] Field of Search ........................... 292/300, DIG. 46, 292/DIG. 55, DIG. 51, 75, 73, 145, 146, 150, DIG. 11, 342

[56] References Cited

U.S. PATENT DOCUMENTS

| | | | |
|---|---|---|---|
| 489,220 | 1/1893 | Currier et al. | 292/300 |
| 1,579,619 | 4/1926 | Kerby | 292/DIG. 55 |
| 1,654,163 | 12/1927 | Evans | 292/DIG. 55 |
| 1,766,183 | 6/1930 | Mealia | 292/300 |
| 2,594,253 | 4/1952 | Vander Veer | 292/92 |
| 2,604,343 | 7/1952 | Fredholm | 292/75 |
| 3,132,884 | 5/1964 | Ahlgren | 292/DIG. 46 |
| 4,109,949 | 8/1978 | Smith | 292/189 |

FOREIGN PATENT DOCUMENTS

| | | |
|---|---|---|
| 1 759 262 | 6/1971 | Germany . |
| 388106 | 2/1933 | United Kingdom . |
| 394470 | 6/1933 | United Kingdom . |

*Primary Examiner*—B. Dayoan
*Assistant Examiner*—John B. Walsh
*Attorney, Agent, or Firm*—Merchant & Gould P.C.

[57] ABSTRACT

A switch cabinet for electronics and electrical engineering is proposed with a door hinged on at least one side (1) as well as a centering mechanism for the level centering of the door during closing (1), where the centering mechanism is arranged in the area of the locking mechanism, and where the centering mechanism's components, one centering piece (3) and one catching part (11), are arranged on the door (1) or on a framework element (2) of the switch cabinet and interlock when closing the door (1).

10 Claims, 2 Drawing Sheets

SWITCH CABINET FOR ELECTRONICS AND ELECTRICAL ENGINEERING

BACKGROUND OF THE INVENTION

The invention concerns a switch cabinet for electronics and electrical engineering, with a door hinged at least on one side as well as a centering mechanism for the level centering of the door when closing.

Switch cabinets of the type initially specified normally consist of metal in order to protect the electrical and electronic components in them from mechanical as well as, if necessary, external electromagnetic influences. The doors, hinged on one side, of such switch cabinets show a relatively high weight and thus the hinges must be accordingly dimensioned. For cost reasons and above all however, for space reasons, limits are set for the load-carrying capacity of these hinges. Therefore the problem which often results in the course of the time is the fact that the doors lower themselves on one side and are thus no longer parallel to the cabinet framework. On the one hand this is an optical problem since the comparison edges of the cabinet framework, which are situated in direct proximity, allow the missing parallelism between door and framework to become overly apparent. On the other hand the danger also exists that the door will tilt and wedge in the cabinet framework. The function of the locking mechanism can be thereby affected.

It is well-known to equip switch cabinets, with a door hinged on one side, with a centering mechanism for the level centering of the door when closing. This consists of an installed sliding block or an accumulating roller on the doors undersurface. The sliding block or the accumulating roller support themselves when the door closes against the undersurface of the cabinet framework and thereby raise the door. Since the application of force when closing the door takes place at the locking mechanism—normally in the center of the door panel—the force for the raising of the door however is necessary at the lower surface of the door panel and the door distorts itself upon closing. In field use, such a door is often closed with a strong kick against its lower surface. This impairs both the life span of the cabinet and the function of the components arranged therein.

Based on this state of the art lies the task of the invention. The function is to improve a switch cabinet, of the type initially specified, in such a manner that a twist-free level centering of the door is ensured when closing.

SUMMARY OF THE INVENTION

This function is solved by a switch cabinet with the features of claim 1. Advantageous arrangement and further development of the invention result from claims 2 through 9.

According to invention, the centering mechanism, used for the level centering of the door when closing the switch cabinet, consists of one centering piece and one catching part. These are arranged on the door or on a framework element of the switch cabinet and interlink when closing the door. It is thereby important that the centering piece and catching part are arranged in the area of the locking mechanism, thus within the area of the applied force when closing the door. A torque, which could cause a distortion of the door when closing, therefore cannot develop or will do so at most in negligible measure. In a closed state the door is held in place by the interlinking of the centering section and the catching part at the cabinet framework. This relieves the hinges and thus increases the life span of the switch cabinet.

According to the invention, the level centering of the door is thus brought about by only two additional sections which can be easily installed. Doing this the centering piece can be fastened on the door and catching part on the cabinet framework, or alternatively catching part on the door and centering piece on the cabinet framework.

The centering piece can be developed as a positioning block with at least one centering bevel. Such a positioning block is stable and develops a centered interlinked closure of door and cabinet framework when closing the door. This is due to the positioning block's centering bevel in cooperation with both a catch block and a complicated structured catching part.

If the catching part also has at least one catch bevel for the centering piece, the centering piece and catching part slide without additional energy expenditure into one another and thereby cause the level centering of the door when closing.

Appropriately the center piece and catching part are shaped such that they form-fit when interlinking.

Special advantages result if the elements which are already available in the locking mechanism of the door are used during the development of the centering section and the catching part:

If the locking mechanism of the door contains a latch member and a retaining plate for the latch member, a catching part for the centering mechanism can, for example, be formed by the retaining plate. For this the retaining plate preferably contains a breakthrough section for the accommodation of the centering section. In order to improve the retaining plate function of the catching part, the retaining plate can be provided with an accumulating bevel for the latch member.

The formation of the catching part as a retaining plate for the latch member simplifies the construction of the switch cabinet since an additional component is omitted.

Further advantages result if the latch member is fastened on an adjustable locking track and the centering piece contains a groove for guidance along the locking track. Since the locking track (to which the centering piece will also be attached after further development of the invention) must always be present for stability reasons an additional component is omitted here also.

According to the just described arrangements of the invention, it is thus possible to completely ensure an easy and safe level centering of a switch cabinet's door upon closing without additional components.

Another further development of the invention can consist of the fact that the centering piece is formed as a conical centering pin and that the catching part consists simply of a drilling for the accommodation of the centering pin. The manufacturing of a drilling is substantially more economical and simpler than the manufacturing and assembly of a separate component.

BRIEF DESCRIPTION OF THE DRAWINGS

On the basis of the attached drawings in the following two design examples the invention is more closely described. It shows.

DESCRIPTION OF THE PREFERRED EMBODIMENT

Figure 1:
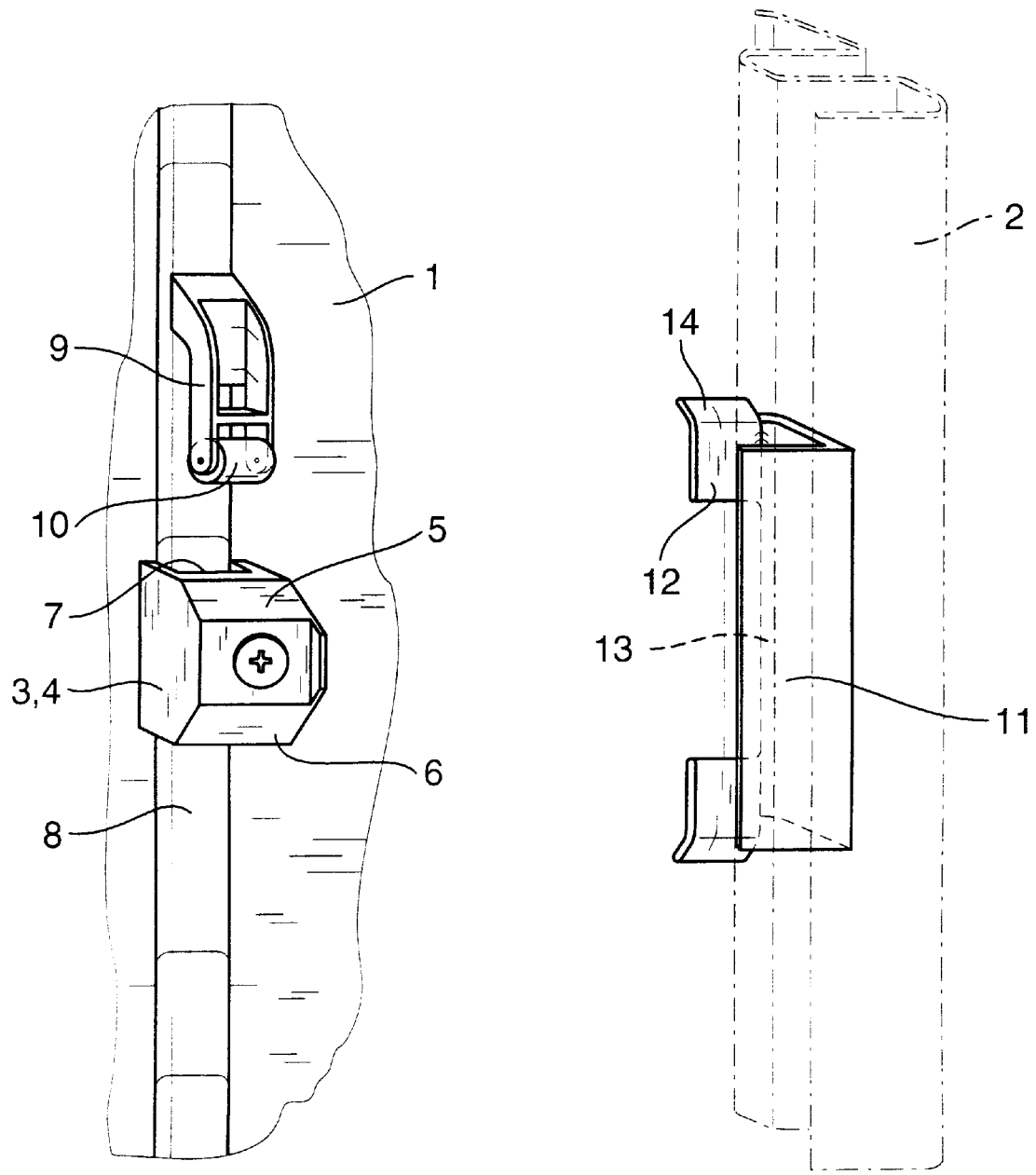
FIG. 1 a perspective representation of the centering mechanism.

FIG. 1 shows a detail of the inside of an opened door 1 as well as a detail of a framework element 2 of the switch cabinet. On the inside of the door is centering piece 3, which is designed as positioning block 4 with an upper centering bevel 5 and a lower centering bevel 6. The positioning block 4 contains a groove 7, into which a vertically locking track 8 is led. A latch member 9 with an accumulating roller 10, is attached to the locking track 8.

On framework element 2, which is only suggested for the sake of clarity, is a catching part 11, which functions at the same time as retaining plate 12 for the latch member 9.

The retaining plate 12 shows a break-through section 13 for the accommodation of the positioning block when closing door 1. The centering bevels 5 and 6 of positioning block 4 can slide along at the edges of break-through section 13 and cause the centering of door 1 upon closing. In the closed state of door 1, positioning block 4 form-fits into break-through section 13 of catching part 11.

The retaining plate 12 is curved on the ends to form an accumulating bevel 14, so the latch member 9 with the help of its accumulating roller 10 can accumulate easily and freely on the retaining plate 12, whereby it attaches to the door 1 on the framework element 2.

Preferably, the functions of the centering piece (3) and the catching part (11) will be assumed by already available items on the locking mechanism of the door (1).

Figure 2:
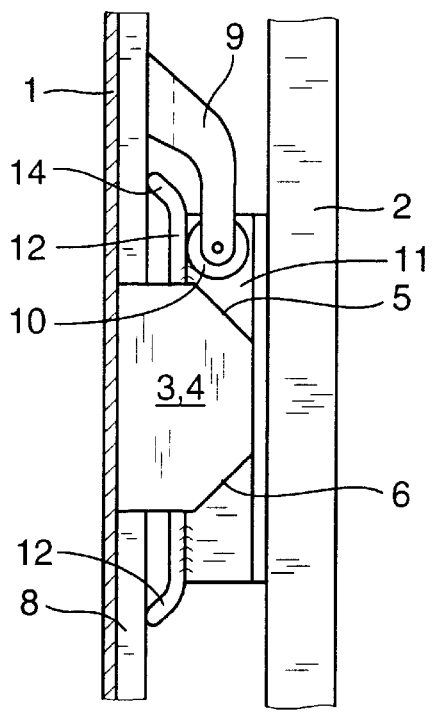
FIG. 2 one lateral view of the centering mechanism in accordance with FIG. 1.

FIG. 2 shows the arrangement from FIG. 1 in the closed state of the door 1, in a lateral view: The positioning block 4 shaped centering piece 3, form-fits into retaining plate 12 of catching part 11, so that the door 1 lies in a tight position relative to the framework element 2. At the same time the locking track 8 is led in the groove 7 of the positioning block 4. Their latch member 9 is pushed with its accumulating roller 10 onto the retaining plate 12, where door 1 is held in the closed state.

Figure 3:
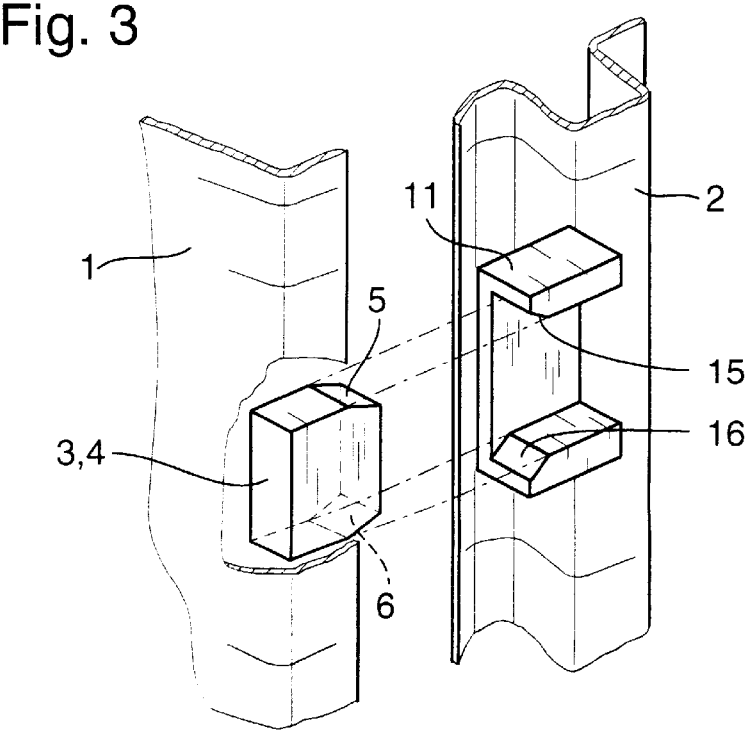
FIG. 3 a perspective representation of a centering mechanism according to another design variation of the invention.

FIG. 3 shows a different form of the invention in relation to FIGS. 1 and 2: On door 1 - shown in simple detail - centering piece 3, which is formed as a positioning block, is attached. This essentially corresponds to the positioning block 4 of the first design example. The framework element 2 however -likewise shown in simple detail - possesses a catching part 11, which is designed as a catch block with an upper catch bevel 15 and a lower catch bevel 16. As is recognizable in FIG. 3, the upper centering bevel 5 and the catch bevel 15 or the lower centering bevel 6 and the lower catch bevel 16 act in combination, in order to ensure level centering when closing the door 1. In the closed state of door 1 the centering piece 4 and the catching part 11, shaped as a catch block, are form-fit and interlinked with each other. This lends a high stability to the closed switch cabinet.

What is claimed is:

1. A switch cabinet for electronics and electrical engineering, having a door hinged at least on one side (1), a locking mechanism, and a centering mechanism for the level centering of the door (1) when closing, wherein the centering mechanism comprises a centering piece (3) and a catching part (11) which are arranged in an area of the locking mechanism on the door (1) or on a framework element (2) of the switch cabinet and interlock when closing the door (1), wherein the locking mechanism of the door (1) includes a latch member (9) and a retaining plate (12) for the latch member (9), and the catching part (11) of the centering mechanism forms the retaining plate (12), and wherein the latch member (9) is fastened on a movable locking track (8) and the centering piece (3) comprises a groove (7) for guidance along the locking track (8).

2. The switch cabinet according to claim 1, wherein the centering piece (3) comprises a positioning block (4) having at least one centering bevel (5,6).

3. The switch cabinet according to claim 1, wherein the catching part (11) comprises at least one catch bevel (15,16) for receiving the centering piece (3).

4. The switch cabinet according to claim 1, wherein the centering piece (3) and the catching part (11) are constructed and arranged for interlinking.

5. The switch cabinet according to claim 1, wherein the retaining plate (12) defines an opening (13) for receiving the centering piece (3).

6. The switch cabinet according to claim 1, wherein the retaining plate (12) comprises an accumulating bevel (14) for receiving the latch member (9).

7. A switch cabinet for electronics and electrical engineering, having a door hinged at least on one side (1), a locking mechanism, and a centering mechanism for the level centering of the door (1) when closing, wherein the centering mechanism comprises a centering piece (3) comprising a positioning block (4) having at least one centering bevel (5,6) and a catching part (11) comprising at least one catch bevel (15,16) for receiving the centering piece (3) which are arranged in an area of the locking mechanism on the door (1) or on a framework element (2) of the switch cabinet and interlock when closing the door (1), and wherein the locking mechanism of the door (1) includes a latch member (9) and a retaining plate (12) for the latch member (9), wherein the catching part (11) of the centering mechanism forms the retaining plate (12), wherein the latch member (9) is fastened on a movable locking track (8) and that the centering piece (3) comprises a groove (7) for guidance along the locking track (8).

8. The switch cabinet according to claim 7, wherein the centering piece (3) and the catching part (11) are constructed and arranged for interlinking.

9. The switch cabinet according to claim 7, wherein the retaining plate (12) defines an opening (13) for receiving the centering piece (3).

10. The switch cabinet according to claim 7, wherein the retaining plate (12) comprises an accumulating bevel (14) for receiving the latch member (9).

* * * * *